(12) United States Patent
Carr

(10) Patent No.: US 8,191,166 B2
(45) Date of Patent: May 29, 2012

(54) SYSTEM AND METHOD FOR SECURELY HANDLING CONTROL INFORMATION

(75) Inventor: Jeffrey Douglas Carr, Poway, CA (US)

(73) Assignee: Broadcom Corporation, Irvine, CA (US)

(*) Notice: Subject to any disclaimer, the term of this patent is extended or adjusted under 35 U.S.C. 154(b) by 842 days.

(21) Appl. No.: 10/310,083

(22) Filed: Dec. 4, 2002

(65) Prior Publication Data

US 2004/0064689 A1 Apr. 1, 2004

Related U.S. Application Data

(60) Provisional application No. 60/414,080, filed on Sep. 27, 2002, provisional application No. 60/419,353, filed on Oct. 18, 2002.

(51) Int. Cl.
*G06F 21/00* (2006.01)
(52) U.S. Cl. .................................................. 726/31
(58) Field of Classification Search ............... 726/26–33
See application file for complete search history.

(56) References Cited

U.S. PATENT DOCUMENTS

| | | | | |
|---|---|---|---|---|
| 6,035,037 | A * | 3/2000 | Chaney | 380/227 |
| 6,055,314 | A | 4/2000 | Spies et al. | |
| 6,064,739 | A | 5/2000 | Davis | |
| 6,571,220 | B1 * | 5/2003 | Ogino et al. | 705/51 |
| 6,885,707 | B2 * | 4/2005 | Tardif | 375/240.25 |
| 7,233,948 | B1 * | 6/2007 | Shamoon et al. | 707/9 |
| 2001/0034715 | A1 * | 10/2001 | Shibata et al. | 705/57 |
| 2002/0012432 | A1 | 1/2002 | England et al. | |
| 2002/0101991 | A1 * | 8/2002 | Bacon et al. | 380/212 |
| 2003/0188164 | A1 * | 10/2003 | Okimoto et al. | 713/172 |

OTHER PUBLICATIONS

Morimoto, Norishige, "Digital Watermarking Technology with Practical Applications", 1999, pp. 107-111, obtained from http://inform nu/Articles/Vol2/v2n4p107-111.pdf.*
Rusling, David, "The Linux Kernel", Apr. 1997, pp. 1-6, obtained from http://www.science.unitn.it/~fiorella/guidelinux/tlk/tlk-html.html.*
Intel, "How to Use OTP Registers for Security Applications", Oct. 13, 1999, pp. 1-6, obtained from http://www.intel.com/design/flcomp/applnots/29226501.pdf.*
Krawczyk et al., "HMAC: Keyed-Hashing for Message Authentication", Feb. 1997, pp. 1-11.*
B.J. van Rijnsoever et al., "Interoperable Content Protection for Digital TV", IEEE Int'l Conference on Multimedia and Expo, XP-000992577, vol. 3, pp. 1407-1410 (Jul. 30, 2000).
P.J. Lenior, "Functional Model for the DVB CPCM Framework," Royal Philips Electronics Presentation, Feb. 2002.

(Continued)

*Primary Examiner* — Jeffrey D Popham
(74) *Attorney, Agent, or Firm* — Thomas, Kayden, Horstemeyer & Risley, LLP

(57) ABSTRACT

Systems and methods that securely handle control information are provided. In one example, a system may include an application specific integrated circuit (ASIC). The ASIC may include, for example, a content processing block and a control processing block. The content processing block may be coupled to the control processing block. The content received by the ASIC may be associated with the control information received by the ASIC. The control processing block may be adapted to validate the control information received by the ASIC. The content processing block may be adapted to process the content received by the ASIC in accordance with the validated control information.

23 Claims, 4 Drawing Sheets

OTHER PUBLICATIONS

Rowan Vevers, "DVB Sub-Group on Commercial Requirements for Copy Protection Systems Report to the Eighteenth Meeting of the DVB Commercial Module (DVB-CM)," DVB Report, DVB-CP8(00)7, Oct. 2000.

Jeff Carr, "Response to DVB Call for Information Copy Protection and Digital Rights Management Technologies," Broadcom Corp., Oct. 2001.

"Call for Proposals for Content Protection & Copy Management Technologies," DVB, DVB Technical Module Sub-Group on Copy Protection Technologies, DVB CPT rev 1.2, Jul. 2001.

Ji et al., "Open Letter following Proposal DVB-CPY-719," Feb. 2002.

"SCTE Proposed Standard Head-end Implementation of OpenCAS™," Society of Cable Telecommunications Engineers, Inc., Engineering Committee, Digital Video Subcommittee, SCTE DVS 278r1, Jul. 2000.

"Data-Over-Cable Interface Specification," MCNS Holdings, L.P., Security Systems Specification, SP-SSI-I01-970506, 1997.

"DES CBC Packet Encryption," General Instrument Corp., SCTE DVS/042, Nov. 1996.

"CD-Rom Based Application Software Consumer and SOHO Copying Trends," Merrill Research Associates, Apr. 2000.

"White Paper—The Ins and Outs of Content Delivery Networks," Stardust.com inc., Dec. 2000.

"CD-Rom Unauthorized Copying Study Executive Summary," Merrill Research Associates, Apr. 1999.

"UDAC-M Host Link Specification, Part 1: Overview," Keitaide-Music Consortium, Ver. 0.9, Dec. 2000.

"Keitaide-Music Technical Specification Part I Overview," Keitaide-Music Consortium, Ver. 1.0, Dec. 2000.

"EPRS8 White Paper," SecureMedia, Inc., 2000.

William Raike "Detailed Supplemental Technical Description of the RPK Public-Key Cryptographic System," 1996.

Joseph M. Winograd, "Audio Watermarking Technologies for Protection of Digital Audio and Video—Presentation to DVD CPTWG," Verance Corporation, Sep. 2000.

John Paddleford, "Digital Rights Management—Protecting Your Content," Microsoft Corporation, undated.

"Common Interface Specification for Conditional Access and Other Digital Video Broadcasting Decoder Applications," DVB, DVB Document A017, May 1996.

"Call for Proposals for Content Protection & Copy Management Technologies," DVD, DVB Technical Module Sub-Group on Copy Protection Technologies, Rev. 1.2, Jul. 2001.

Bechtolsheim et al., "Responses to DVB-CP Requirements (DVB-CM283) for the OCCAM Open Conditional Content Access Management System," Cisco Systems, Inc. Oct. 2001.

"NetDRM Technology Response to DVD Call for Proposals for Content Protection & Copy Management Technologies," DVD, Matsushita Electric Industrial Co., Ltd., Oct. 2001.

"Proposal for Content Protection & Copy Management Technologies submitted to DVB (Digital Video Broadcasting)," Veridian, Oct. 2001.

"Response to the DVB-CPT Call for Proposals for Content Protection & Copy Management Technologies," Royal Phillips Electronics N.V., Oct. 2001.

Kish et al., "An Information Paper in Response to the Call for Proposals Issued by the DVB Copy Protection Technologies Sub-Group of the DVB Technical Module," VWM Companies, Oct. 2001.

"Proposals for Content Protection and Copy Management Technologies," Sony International (Europe), Oct. 2001.

Olsthoorn et al., "Flexcop—A Flexible Copy Protection Framework," Flexcop, undated.

"Proposals for DVB Content Protection & Copy Management Technologies," Nokia, Version 1.0, Oct. 2001.

"4C Entity Response to DVB CPT Call for Proposals Regarding Content Protection & Copy Management Technologies—Content Protection System Architecture—A Comprehensive Framework for Content Protection, with CPPM and CPRM Technologies," 4C Entity, LLC, Oct. 2001.

"SmartRight Answer to the Call for Proposals for Content Protection & Copy Management Technologies," Thomson Multimedia et al., Oct. 2001.

"Answer to Call for Proposals for Content Protection & Copy Management Technologies," Thales Communication, Oct. 2001.

"IBM Response to DVB CPT Call for Proposals Regarding Content Protection & Copy Management: xCP Cluster Protocol," IBM, Oct. 2001.

"Digital Transmission Licensing Administrator's (DTLA) Response to DVB-CPT Call for Proposals Concerning Content Protection & Copy Management Technologies Protected Transport of Commercial Entertainment Content Using DTCP Technology," DTLA, 2001.

Winograd et al., "Audio Watermarking System for Content Protection within a DVB CPCM Environment," Verance Corporation, Oct. 2001.

"Proposed Baseline DVB-CPCM Response to DVB-CPT Call for Proposal Concerning Content Protection & Copy Technologies," Matsushita Electric Industrial Co., Ltd., Oct. 2001.

"Response to the Call for Proposals Content Protection and Copy Management Technologies by DVB Copy Protection Technologies Sub-Group of DVB Technical Module," Pioneer Corporation, Oct. 2001.

Kudumais, et al., "OPIMA/OCCAMM: A Solution to DVB Call for Proposals for Content Protection & Copy Management Technologies," OCCAMM, undated.

Capitant et al., "Digital Rights Management & Copy Protection An Information Paper in Response to the Call for Proposals Issued by the DVB Copy Technologies Sub-Group of the DVB Technical Module," Macrovision Corporation and Widevine Technologies Oct. 2001.

"Content Protection System Architecture A Comprehensive Framework for Content Protection, with High-Bandwidth Digital Content Protection (HDCP) Technology," Digital Content Protection, LLC, Oct. 2001.

"Digimarc Response to DVB_CPCM CFP: Watermarking Applications Information Paper," Digimarc Corporation, Oct. 2001.

Agnelli et al., "LAN Interconnection Via ATM Satellite Links for CAD Applications: The UNOM Experiment," undated.

Löytänä et al., "Session Management Problems in Narrowband Interactive Services," Ad Hoc Group on Systems for Interactive Services, undated.

"Presentation to the TM," Simulcrypt Technical Group, undated.

"The DVB Project Promotion and Communication Module," DVB Project Office, Digital Video Broadcasting Presentation, undated.

"Digital Video Broadcasting (DVB); Support for Use of Scrambling and Digital Broadcasting Systems," European Telecommunications Standards Institute, ETSI Technical Report ETR 289, Oct. 1996.

"Digital Video Broadcasting (DVB); DVB SimulCrypt; Part 1: Head-end architecture and synchronization," European Telecommunications Standards Institute, ETSI Technical Report TS 101 197-1 v1.1.1 Jun. 1997.

"IPsec Processing," Microsoft Corporation et al, 1998.

"IPsec Databases," Microsoft Corp. Document, undated.

Jeff Carr; Copy Protection and Digital Rights Management Technologies; Oct. 18, 2001; pp. 1-13.

* cited by examiner

SYSTEM AND METHOD FOR SECURELY HANDLING CONTROL INFORMATION

RELATED APPLICATIONS

This application makes reference to, claims priority to and claims benefit from U.S. Provisional Patent Application Ser. No. 60/414,080, entitled "System and Method for Securely Handling Control Information" and filed on Sep. 27, 2002; and U.S. Provisional Patent Application Ser. No. 60/419,353, entitled "System and Method for Securely Handling Control Information" and filed on Oct. 18, 2002.

INCORPORATION BY REFERENCE

The above-referenced United States patent applications are hereby incorporated herein by reference in their entirety.

BACKGROUND OF THE INVENTION

Digital content or analog content may be secured and restricted through the use of control information such as, for example, digital rights management (DRM) controls and copy control information (CCI). DRM or CCI controls accompany the content whether the content is a single content component (e.g., a video component) or a group of components (e.g., a video component, an audio component and a data component) forming a multimedia presentation.

DRM and CCI controls are often linked (e.g., via a cryptographic link, a pointer structure pointing to a program number, a watermark, etc.) to the content they control and must be protected from tampering. The control information may be protected by an applied authentication that authenticates the link between the control information and the associated content to verify that the DRM and the CCI controls have not been modified. However, processing DRM and CCI controls in a conventional software-only environment leaves the control information more vulnerable to unauthorized tampering or hacking. Furthermore, other conventional systems, which employ proprietary conditional access systems, may attempt to protect the conditional access control information in tamper resistant hardware; however, the tamper resistant hardware is segregated from the actual content processing ASIC leaving the final configuration of the content processing ASIC vulnerable to tampering by an untrusted party. In addition, conventional systems may not be able to securely modify the control information by a trusted party.

Further limitations and disadvantages of conventional and traditional approaches will become apparent to one of ordinary skill in the art through comparison of such systems with some aspects of the present invention as set forth in the remainder of the present application with reference to the drawings.

BRIEF SUMMARY OF THE INVENTION

Aspects of the present invention may be found in, for example, systems and methods that securely handle control information. In one embodiment, the present invention may provide a system that securely handles control information. The system may include, for example, an application specific integrated circuit (ASIC). The ASIC may include, for example, a content processing block and a control processing block. The content processing block may be coupled to the control processing block. The content received by the ASIC may be associated with the control information received by the ASIC. The control processing block may be adapted to validate the control information received by the ASIC. The content processing block may be adapted to process the content received by the ASIC in accordance with the validated control information.

In another embodiment, the present invention may provide a system that securely handles control information. The system may include, for example, an integrated circuit. The integrated circuit may include, for example, a content processing block and a control processing block. The content processing block may be coupled to the control processing block. The content received by the integrated circuit may be associated with the control information received by the integrated circuit. The control processing block may be adapted to validate the control information received by the integrated circuit. The content processing block may be adapted to process the content received by the integrated circuit in accordance with the validated control information.

In yet another embodiment, the present invention may provide a system that securely handles control information. The system may include, for example, an integrated circuit. The integrated circuit may include, for example, a content processing block and a control processing block. The content processing block may be coupled to the control processing block. The control information received by the control processing block may be linked with the integrated circuit. The control processing block may be adapted to validate the control information received by the integrated circuit. The content processing block may be adapted to process the content received by the integrated circuit in accordance with the validated control information.

In another embodiment, the present invention may provide a method that securely handles control information. The method may include one or more of the following: validating the control information; decoding the validated control information; and configuring a content processor of an ASIC based on the decoded control information. The validating, the decoding and the configuring are performed within the ASIC.

These and other features and advantages of the present invention may be appreciated from a review of the following detailed description of the present invention, along with the accompanying figures in which like reference numerals refer to like parts throughout.

DETAILED DESCRIPTION OF THE INVENTION

One or more embodiments of the present invention may relate to systems and methods that securely handle control information such as, for example, digital rights management (DRM) controls or copy control information (CCI) by employing a content processing integrated circuit. The content processing integrated circuit may be designed to provide a tamper resistant environment for handling and for executing in accordance with the control information. The content processing integrated circuit may provide a secure integrated hardware environment in which the control information may be protected and the content associated with the control information may be processed based upon, at least in part, the control information.

Figure 1:
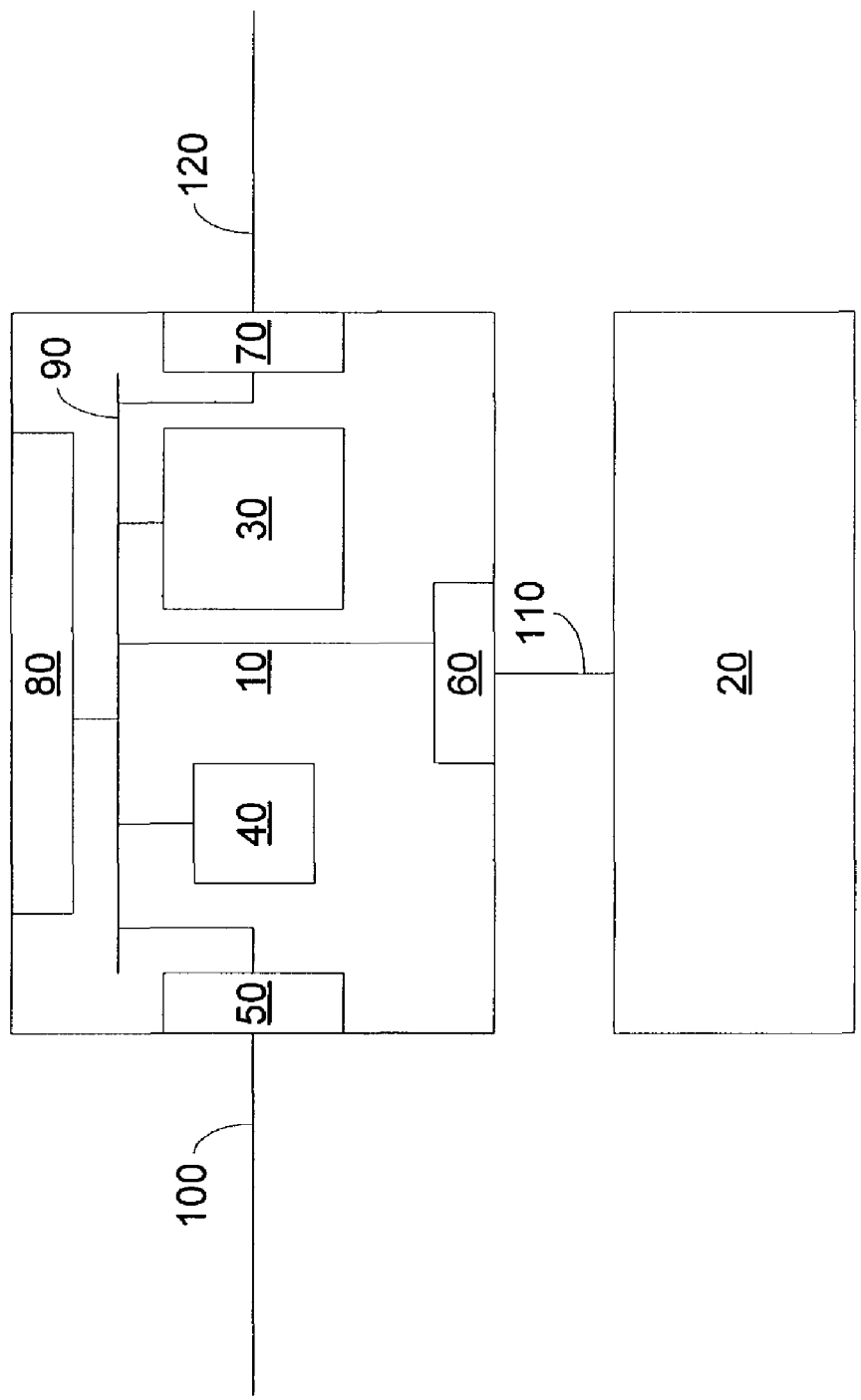
FIG. 1 shows a block diagram illustrating an embodiment of a system that securely handles control information according to the present invention.

FIG. 1 shows a block diagram illustrating an embodiment of a system that securely handles control information according to the present invention. The system may include, for example, a set top box 10 and a storage device 20. The set top box 10 may be coupled to the storage device 20. In one embodiment, the set top box 10 and the storage device 20 may form a personal video recording (PVR) system. In another embodiment, the storage device 20 may be part of the set top box 10. The set top box 10 may include, for example, a content processing ASIC 30, a processor 40, an input interface 50, a storage interface 60, an output interface 70, a user interface 80 and a bus 90. The bus 90 may be coupled, for example, with at least the other above-identified components of the set top box 10. The input interface 50 may be coupled, for example, to an input connection 100, which may include one or more inputs. The output interface 70 may be coupled, for example, to an output connection 120, which may include one or more outputs. The storage interface 60 may be coupled, for example, to the storage device 20 via a connection 110.

Although illustrated as a set top box, the present invention also contemplates using other devices that process data accompanied by control information. The storage device 20 may include, for example, an electrical storage device, a mechanical storage device, an optical storage device, a magnetic storage device, a storage network or any combination thereof. The user interface 80 may include, for example, a graphic user interface, a keyboard, a key pad, a mouse, a wireless input device, a wireless communications device, a touch sensitive screen or other types of user interfaces. The connections 100-120 may include, for example, one or more wires, cables, fibers, wireless communications means or combinations thereof.

In operation, frames (e.g., a stream of frames or packets) including content such as, for example, audio/visual information and control information may be carried via the connection 100 from a central content provider to a subscriber. The control information may include, for example, DRM or CCI controls. The frames may be received by the input interface 50 and may be sent to the content processing ASIC 30. The processor 40 may also provide feature control information to the content processing ASIC 30 via, for example, software running on the processor 40 or the user interface 80. Feature control information may include settings for a particular device configuration such as, for example, changing a program channel, recording a channel, playing back a channel, etc. The processor 40 or the content processing ASIC 30 may use the storage device 20, for example, for buffering information and may employ a direct memory access (DMA) engine (not shown) to read information from or to write information into the storage device 20.

The content processing ASIC 30 may receive the audio/visual information and the control information and perform one or more of the following tasks: receive the control information; validate the authenticity of the control information; decode the control information and configure its content processor according to the decoded control information; modify the control information, if appropriate, and reauthenticate the updated control information and provide the control information for secure off-chip storage. In one embodiment, one or more of the above-identified tasks may be performed by the content processing ASIC 30 and may enjoy enhanced security by being executed within the protection of the hardware of the content processing ASIC 30. Since the ASIC 30 provides such enhanced security, the ASIC 30 itself can be considered a trusted party. Thus, for example, modifications to the control information can be assured to be by a trusted party.

Figure 2:
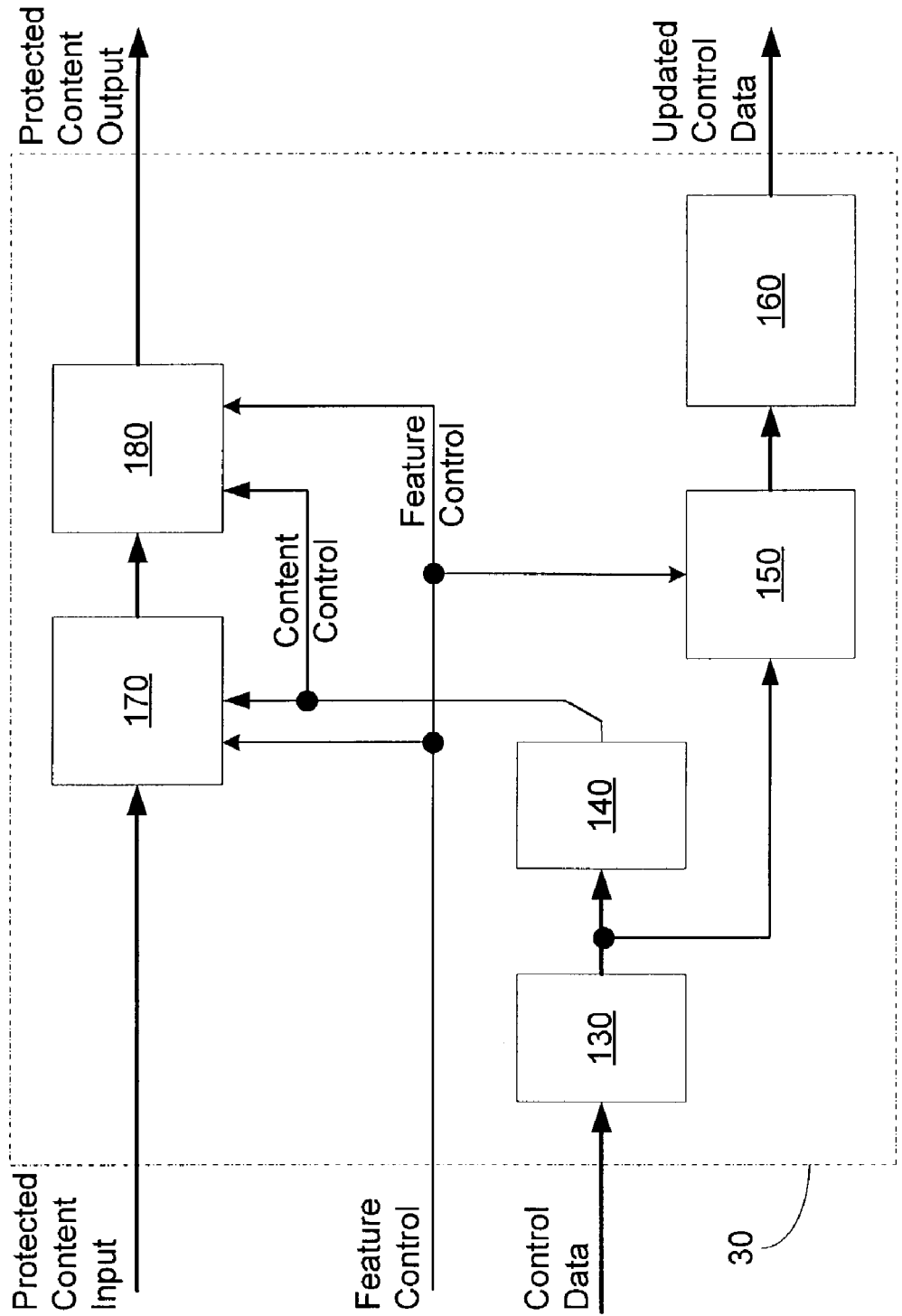
FIG. 2 shows a block diagram of an embodiment of a content processing ASIC according to the present invention.

FIG. 2 shows a block diagram of an embodiment of a content processing ASIC according to the present invention. The content processing ASIC 30 may include, for example, a control validation block 130, a control decoding block 140, a control modifying block 150, an authentication application block 160, a content processing block 170 and a content output control block 180. Control data input may be coupled to the control validation block 130. The control validation block 130 may be coupled to the control decoding block 140 which, in turn, may be coupled to both the content processing block 170 and the content output control block 180. The control validation block 130 may also be coupled to the control modifying block 150 which, in turn, may be coupled to the authentication application block 160. The authentication application block 160 may be coupled to an updated control data output. Protected content input may be coupled to the content processing block 170 which, in turn, may be coupled to the content output control block 180. The content output control block 180 may be coupled to the protected content output. A feature control input may be coupled to the content processing block 170, the content output control block 180 and the control modifying block 150. Although shown as separate inputs, the protected content input and the control data input may be part of the same physical input. The protected content and the control data may be multiplexed on the same physical input.

In one embodiment, the ASIC 30 may store information to which the control information may be linked or with which the control information may be associated. For example, the ASIC 30 may store, for example, a key value, a device identification number, etc. in secure hardware (e.g., a one-time programmable non-volatile memory). Some examples of such systems may be found, for example, in U.S. patent application Ser. No. 10/141,197, entitled "System and Method for Configuring Device Features via Programmable Memory" and filed on May 8, 2002; U.S. patent application Ser. No. 10/141,599, entitled "System and Method for Programming Non-Volatile Memory" and filed on May 8, 2002; U.S. patent application Ser. No. 10/141,549, entitled "System and Method for Securely Controlling Access to Device Functions" and filed on May 8, 2002; which are hereby incorporated herein by reference in their entirety. Thus, the control information may be linked or associated with the particular key value or the particular device identification number. In one example, the control information may be linked with the ASIC 30.

Figure 3:
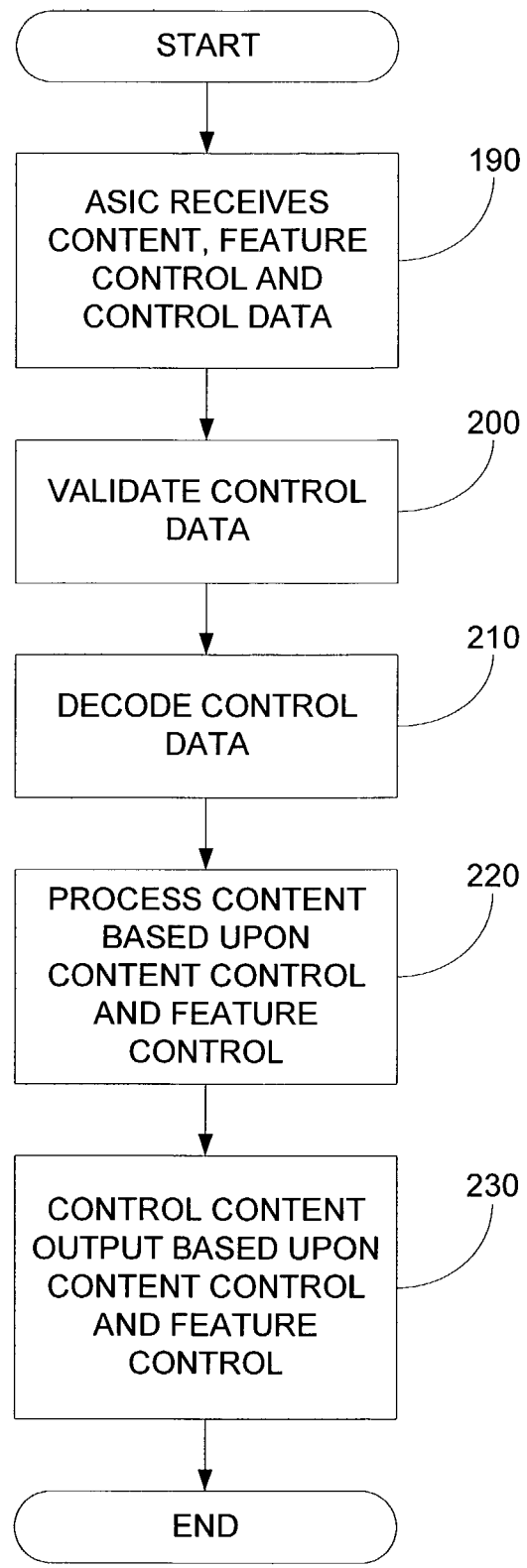
FIG. 3 shows a flow chart illustrating an embodiment of a process that securely handles control information according to the present invention.

FIG. 3 shows a flow chart illustrating an embodiment of a process that securely handles control information according to the present invention. In step 190, the content processing ASIC 30 may receive content, feature control and control data. The content processing ASIC 30 may receive protected content via the protected content input and the accompanying control data via the control data input. The content processing ASIC 30 may receive feature control via the feature control input. Feature control may be set via software control run in the set top box 10 and/or via the user interface 80. The control data (e.g., DRM and CCI controls) may be communicated to the content processing ASIC 30 along with the content they protect. The control data may be delivered in-band or out-of-band from the corresponding content and may be delivered using a particular cryptographic authentication. In step 200, the control data may be validated. The control data may be validated according to, for example, a particular authentication algorithm in the control validation block 130. In one embodiment, the authentication may also include a key that links it to the authentication of the source and destination points as well as the means to unlock access to the corresponding content. In step 210, the control data may be decoded. After the control data has been validated in the control validation block 130, the control decoding block 140 may decode the control data. In step 220, the protected content may be processed in the content processing block 170 based upon, for example, the content control and the feature control. In one embodiment, content may be processed based upon enabled or available device capabilities and features in addition to considering content control and the feature control. Thus, for example, the control information may indicate that the recording of content is allowed with strong encryption (e.g., 3DES); however, if the ASIC 30 cannot strongly encrypt the content because strong encryption has not been enabled or is not available, then the recording may not proceed. The content processing block 170 may also provide, for example, MPEG decoding, audio/video decompression, PVR data recording or other types of functionality. Furthermore, the content processing block 170 may provide a data transport engine that may process multiple transports streams simultaneously. In step 230, the content output from the content processing ASIC 30 may be based upon, for example, the content control and the feature control. The content output control block 180 may control its content output based upon, for example, the validated, decoded control data and the feature control. If the output is digital, then the content output may be protected using, for example, 5C, DVI, DES, 3DES, etc. If the output is analog, then the content may be degraded, for example, by sub-sampling a digital source or the content may be protected, for example, by applying a watermark. Other techniques for securing data are also contemplated by the present invention including, for example, using a watermark.

Figure 4:
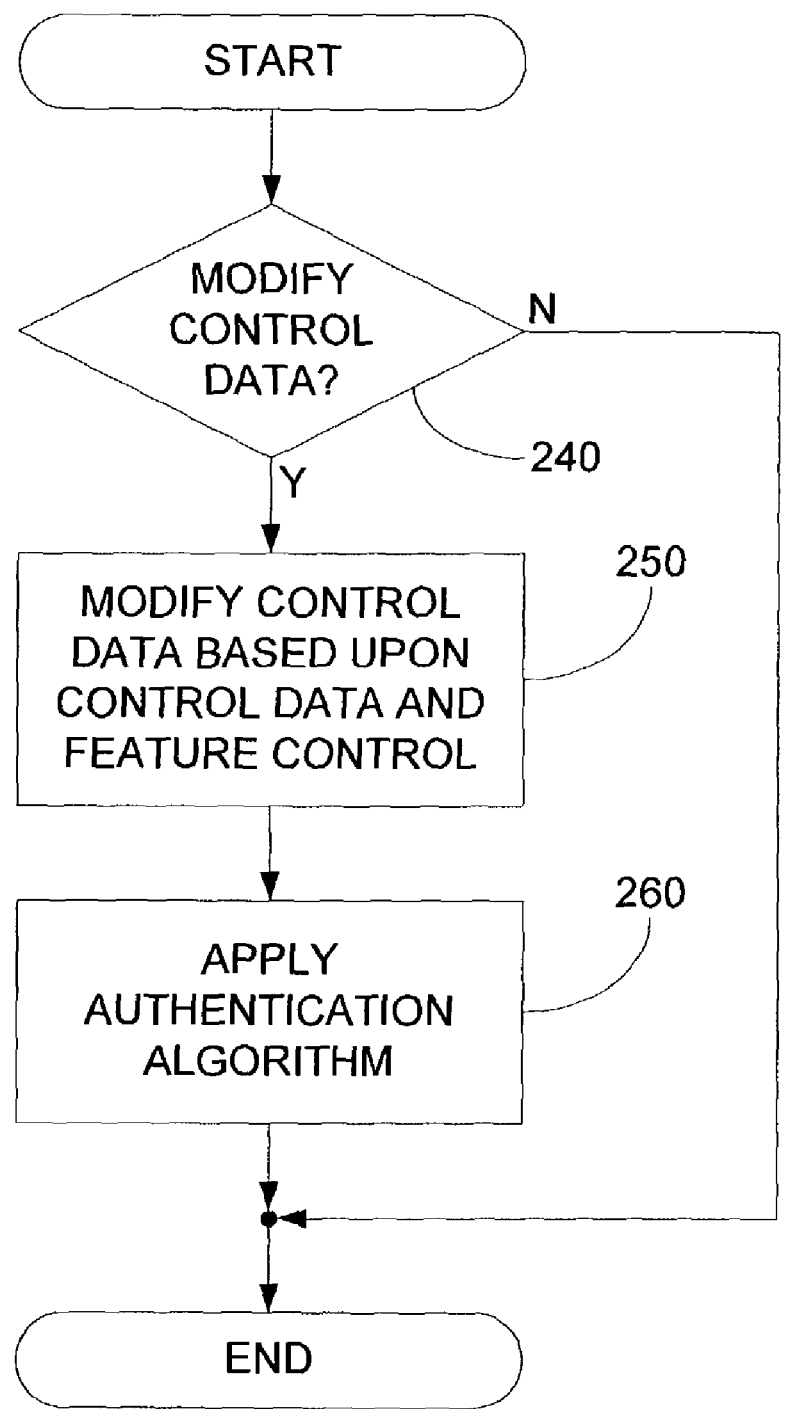
FIG. 4 shows a flow chart illustrating an embodiment of a process that modifies control data according to the present invention.

FIG. 4 shows a flow chart illustrating an embodiment of a process that modifies control data according to the present invention. In one embodiment, the modification process may occur in the security of the content processing ASIC 30. In query 240, it may be determined whether control data should be modified. If the control data is not to be modified, then the process is completed. If the control data is to be modified, then, in step 250, the control data may be modified based upon, for example, the control data and the feature control. In one example, the control data input to the content processing ASIC 30 may indicate that the content may be copied only once. Once a copy of the content is executed via, for example, a copy request in the feature control, then the control modifying block 150 may modify the control data. In one example, after the execution of the copy, the control data may be changed from "one copy permitted" to "no more copying permitted". In step 260, an authentication algorithm may be applied. The authentication algorithm need not be the same algorithm used by, for example, the incoming control data. The authentication application block 160 may apply an authentication algorithm onto the modified control data resulting in, for example, an authentication control word, a message authentication code (MAC), a watermark or other authentication output being associated with the updated control data output.

As mentioned above, control data may include control information allowing only one copy to be permitted or no more copying to be permitted. The control data may include other types of, for example, CCI. With regard to analog component output, the CCI may indicate whether the analog component may be allowed or not allowed as an output. The CCI may also indicate, with regard to digital signal output, whether digital signal output is allowed or not allowed; or whether only uncompressed or compressed digital signal output is allowed. Copy rights may be included in the CCI. Thus, the CCI may indicate that no copying is allowed, one copy is allowed, no further copying is allowed or that there is no copy control. The CCI may also indicate whether retransmission of content out to the home network or beyond the home is allowed or not allowed. The CCI may control the output resolution. For example, the CCI may indicate that there are no constraints over unprotected analog component outputs. Alternatively, the CCI may indicate a constraint of no more than TBD when transmitting over unprotected analog component outputs. In another example, the CCI may indicate a storage content playback count.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A set top box comprising
an integrated circuit comprising a first input of the integrated circuit, a second input of the integrated circuit, a third input of the integrated circuit, a first output of the integrated circuit, a second output of the integrated circuit, a content processing block, a content output control block, a control validation block, a control decoding block, a control modifying block and an authentication application block, wherein the first input is operatively coupled to the content processing block which, in turn, is operatively coupled to the content output control block which, in turn, is operatively coupled to the first output, wherein the second input is operatively coupled to the control validation block which, in turn, is operatively coupled to the control decoding block which, in turn, is operatively coupled to the content processing block, wherein the control validation block is operatively coupled to the control modifying block which, in turn, is operatively coupled to the authentication application block which, in turn, is operatively coupled to the second output, wherein the third input is operatively coupled to the content output control block which, in turn, is operatively coupled to the first output, wherein the third input is operatively coupled to the control modifying block which, in turn, is operatively coupled to the authentication application block which, in turn, is operatively coupled to the second output; and
a processor operatively coupled to the integrated circuit, wherein the integrated circuit receives digital rights management control information via the second input, wherein content received by the integrated circuit is associated with the digital rights management control information,
wherein the control validation block validates the digital rights management control information received by the integrated circuit via the second input and provides the validated digital rights management control information to the control decoding block and to the control modifying block, wherein the control decoding block decodes the validated digital rights management control information and provides the decoded digital rights management control information to the content processing block and to the content output control block, wherein the processor provides, via the third input, feature control information to the content processing block and the content output control block, wherein the content processing block processes the content received via the first input of the integrated circuit in accordance with the decoded digital rights management control information and the feature control information that were received by the content processing block via the first input and provides the processed content to the content output control block, wherein the content output control block processes the content that was processed by the content processing block in accordance with the decoded digital rights management control information and the feature control information that were received by the content output control block, wherein the processing of the content output control block includes securing before sending to the first output of the integrated circuit, and wherein the control modifying block modifies the validated digital rights management control information provided by the control validation block in accordance with the feature control information that was provided by the processor and provides the modified digital rights management control information to the authentication application block.

2. The set top box according to claim 1, wherein the processing of the content output control block includes degrading by sub-sampling.

3. The set top box according to claim 1, wherein the authentication application block applies an authentication algorithm onto the modified digital rights management control information received from the control modifying block to generate at least one of an authentication control word associated with the modified digital rights management control information and a message authentication code associated with the modified digital rights management control information.

4. The set top box according to claim 1, wherein the authentication application block applies an authentication algorithm onto the modified digital rights management control information received from the control modifying block to generate a watermark associated with the modified digital rights management control information.

5. The set top box according to claim 1, wherein the authentication application block applies an authentication algorithm onto the modified digital rights management control information received from the control modifying block to generate an authentication output that is associated with the modified digital rights management control information.

6. The set top box according to claim 1, wherein the feature control information is set by a user interface.

7. The set top box according to claim 1, wherein the content output control block provides a first output signal to the first output of the integrated circuit, and wherein the authentication application block provides a second output signal to the second output of the integrated circuit.

8. The set top box according to claim 1,
wherein the content processing block has a fourth input that is connected to the first input of the integrated circuit, a fifth input that receives the decoded digital rights management control information from the control decoding block, a sixth input that receives the feature control information from the third input and a third output for connecting to the content output control block, and wherein the content output control block has a seventh input for the decoded digital rights management control information, an eighth input for the feature control information, a ninth input for connecting to the content processing block and a fourth output that is connected to the first output of the integrated circuit.

9. The set top box according to claim 1, wherein the integrated circuit stores information to which the digital rights management control information is linked or associated.

10. The set top box according to claim 1, wherein the integrated circuit stores a key value in a one-time-programmable (OTP) non-volatile memory.

11. A system for securely handling control information, comprising:
an application specific integrated circuit (ASIC) comprising a first input of the ASIC, a second input of the ASIC, a third input of the ASIC, a first output of the ASIC, a second output of the ASIC, a content processing block, a content output control block, a control validation block, a control decoding block, a control modifying block and an authentication application block, wherein the first input is operatively coupled to the content processing block which, in turn, is operatively coupled to the content output control block which, in turn, is operatively coupled to the first output, wherein the second input is operatively coupled to the control validation block which, in turn, is operatively coupled to the control decoding block which, in turn, is operatively coupled to the content processing block, wherein the control validation block is operatively coupled to the control modifying block which, in turn, is operatively coupled to the authentication application block which, in turn, is operatively coupled to the second output, wherein the third input is operatively coupled to the content output control block which, in turn, is operatively coupled to the first output, wherein the third input is operatively coupled to the control modifying block which, in turn, is operatively coupled to the authentication application block which, in turn, is operatively coupled to the second output, wherein the ASIC receives protected content via the first input, feature control information via the third input, and content control information via the second input, wherein the control validation block receives the content control information via the second input, validates the content control information and provides the validated content control information to the control decoding block and to the control modifying block, wherein the control decoding block receives the validated content control information, decodes the validated content control information and provides the decoded, validated content control information to the content processing block and to the content output control block, wherein the content processing block receives the feature control information from the third input, the decoded, validated content control information from the control decoding block and the protected content from the first input and processes the protected content based on the feature control information and the decoded, validated content control information, wherein the content output control block processes the processed protected content from the content processing block based on the decoded, validated content control information and the feature control information, wherein the processing of the content output control block includes securing before sending to the first output of the ASIC, wherein the control modifying block modifies the validated content control information provided by the control validation block based on the feature control information and provides the modified, validated content control information to the authentication application block.

12. The system according to claim 11, wherein the decoded, validated content control information received by the control processing block is linked with the ASIC based on particular information stored in the ASIC.

13. The system according to claim 12, wherein the particular information comprises at least one of a key value and a device identification number.

14. The system according to claim 11, wherein the decoded, validated content control information received by the control processing block is linked with the ASIC based on particular information stored in a one-time-programmable (OTP) non-volatile memory.

15. The system according to claim 11, wherein the content output control block provides a first output signal to the first output of the ASIC in which the first output signal has been degraded by sub-sampling for protection.

16. The system according to claim 11, wherein the content output control block provides a first output signal that has been degraded to protect the protected content processed by the ASIC if the first output signal is an analog signal, and wherein the content output control block provides a first output signal that has been encrypted to protect the protected content processed by the ASIC if the first output signal is a digital signal.

17. The system according to claim 11, wherein the authentication application block applies an authentication algorithm onto the modified, validated content control information received from the control modifying block to generate an authentication control word associated with the modified control information.

18. The system according to claim 11, wherein the authentication application block applies an authentication algorithm onto the modified, validated content control information received from the control modifying block to generate a message authentication code associated with the modified, validated content control information.

19. The system according to claim 11, wherein the authentication application block applies an authentication algorithm onto the modified, validated content control information received from the control modifying block to generate a watermark associated with the modified, validated content control information.

20. The system according to claim 11, wherein the authentication application block applies an authentication algorithm onto the modified, validated content control information received from the control modifying block to generate an authentication output that is associated with the modified, validated content control information.

21. The system according to claim 11, wherein the content control information relates to at least one of digital rights management control information and copy control information.

22. The system according to claim 11, wherein the content processing block has a fourth input for the protected content, a fifth input for the decoded, validated content control information, a sixth input for the feature control information and a third output for connecting to the content output control block, and wherein the content output control block has a seventh input for the decoded, validated content control information, an eighth input for the feature control information, a ninth input for connecting to the content processing block and a fourth output that is connected to the first output of the ASIC.

23. The system according to claim 11, wherein the ASIC stores a key value in a one-time-programmable (OTP) non-volatile memory.

* * * * *